Nov. 8, 1960 E. HASLAM 2,959,430
PIPE COUPLING WITH A PUSHED-WEDGE TYPE METALLIC PACKING
Filed Sept. 27, 1957
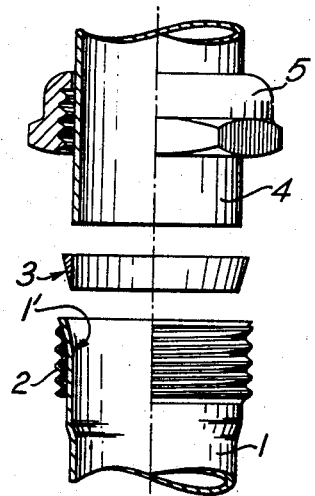
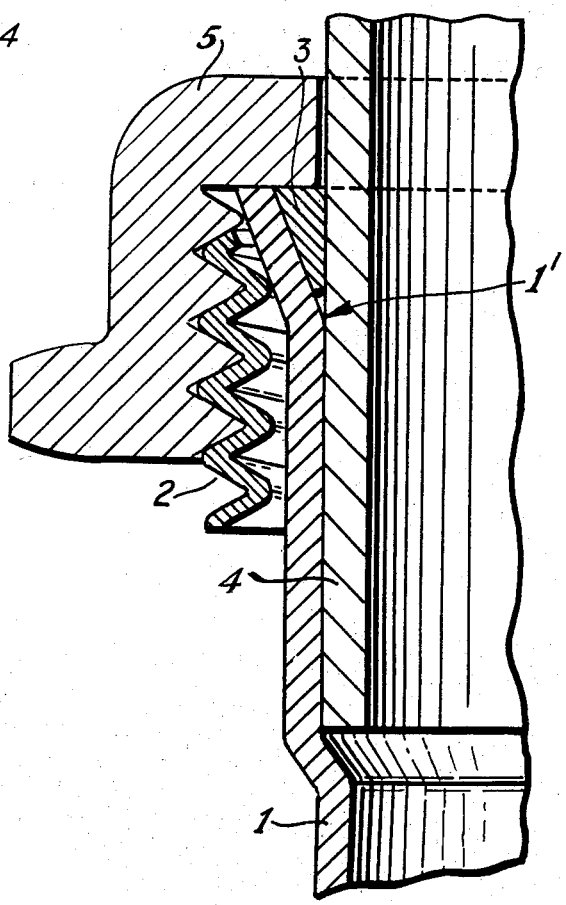
Inventor:
Ernest Haslam
By his attorneys:
Baldwin & Wight

United States Patent Office 2,959,430
Patented Nov. 8, 1960

2,959,430

PIPE COUPLING WITH A PUSHED-WEDGE TYPE METALLIC PACKING

Ernest Haslam, London, England, assignor to Dreh Patents Limited, London, England, a company of England Filed Sept. 27, 1957, Ser. No. 686,717

1 Claim. (Cl. 285—342)

This invention relates to pipe joints and more particularly to joints comprising telescopically intercalating parts which are screw engageable.

It is an object of the present invention to provide a simple and effective fluid tight joint between two plain ended pipes, such as may be found for instance in plumbing installations. The joint according to the invention is especially useful in application to copper tubing; it may also be applied with advantage when one of the pipes cannot be readily screw threaded or otherwise altered or worked upon. Appreciable variations in dimensional tolerance can be accommodated.

In British patent specification No. 719,143, we have described a method and a tool for simultaneously forming on a pipe made of non-resiliently deformable material, an internal and external screw thread; the threaded portion of the wall of the pipe so treated has a zigzag or sharply sinuous form as seen in longitudinal section.

According to the present invention a joint between two plain pipes is formed: by surrounding the end of the first pipe with a loosely fitting sleeve screw-threaded internally and externally so as to have a zigzag or sharply sinuous longitudinal wall section; expanding the mouth of said first pipe to produce a tight fit within said sleeve; introducing into the mouth a plain sleeve, preferably tapered inwardly with respect to the mouth, of a mean diameter between that of the expanded mouth and that of the other, second, pipe; introducing the second pipe within the plain sleeve into the expanded mouth, said second pipe passing first through a cap member adapted to abut against the outer end of the plain sleeve and to screw onto the outside of the first, screw threaded, sleeve; and screwing up the gap thereon to tighten the joint.

The screw thread on the first sleeve is preferably produced by the method and tool described in British patent specification No. 719,143, and the screw thread on the cap may also be so formed. The expansion of the mouth may be obtained by conventional means.

The joint produced, especially when formed wholly in copper, is very firmly locked by the co-action of the innermost sleeve and the various threads; it is easy to produce, and presents a neater appearance than the corresponding joints hitherto used, which commonly involved soldering.

In the accompanying drawing, there are shown, partially in section, in Figure 1 an exploded side elevation and in Figure 2 an assembled side elevation of a pipe-joint formed according to the invention. In this drawing, the end portion of a plain metallic pipe 1 is shown surrounded loosely by a screw-threaded metallic sleeve 2. The sleeve 2 is screw-threaded internally and externally according to the method of British patent specification No. 719,143. As stated above, the screw-threaded sleeve has a sharply sinuous, zig-zag shape, and, as shown in Figure 2, includes substantially straight wall portions extending between and connecting the internal and external screw-thread convolution crests.

The mouth 1' of the pipe 1 is expanded to make a tight fit within the sleeve 2, the screw-threaded sleeve 2 then loosely fitting around the pipe 1 except where the sleeve surrounds and tightly fits the expanded mouth 1'. A plain tapered-section metallic sealing sleeve 3, of a size to fit closely within the expanded mouth 1', is provided to be slipped over the second metallic pipe 4 to be joined. The sealing sleeve 3 has an internal cylindrical surface snugly fitting the exterior of the pipe 4. The outer surface of the sleeve 3 is tapered complementarily to the internal taper of the expanded mouth of the pipe 1.

When the joint is assembled by introducing the pipe 4 and bearing sleeve 3 into the internally and externally tapered end or mouth 1' of the pipe 1, and applying a cap member 5, convolutions on the outside of the sleeve 2 will engage in internal threads in the cap member, and convolution crests on the inside of the sleeve 2 will engage the expanded mouth 1'. By turning of the cap member 5, the tapered sleeve 3 is urged into the confined space and becomes wedged securely between the walls of the pipes, by the action of the cap 5 which is screwed down onto the threaded sleeve 2. The convolution crests on the inside of the screw-thread sleeve will then completely circumferentially engage the expanded mouth of the pipe 1 only.

All the parts described are suitably of copper except for the cap 5 which is for example of brass.

What is claimed is:

A pipe joint between two metallic pipes, the first of which has an expanded mouth forming an internally and externally tapered end and the second of which extends through said expanded mouth into said first pipe, comprising an internally and externally screw-threaded metallic sleeve having a sharply sinuous, zig-zag wall section including substantially straight wall portions extending between and connecting the internal and external screw-thread convolution crests, said screw-threaded sleeve relatively loosely fitting around said first pipe except where surrounding said expanded mouth and relatively tightly fitting said expanded mouth; a plain metallic sealing sleeve within said expanded mouth and having a tapered outer surface complementary to said internal taper with a mean diameter between that of said expanded mouth and that of said second pipe and having an internal cylindrical surface snugly fitting the exterior of said second pipe; and an internally threaded metallic screw cap surrounding said second pipe and abutting against the outer end of said plain sleeve and screwed onto the outside of said screw-threaded sleeve, convolutions on the outside of said screw-threaded sleeve engaging the internal threads of said screw cap and convolution crests on the inside of said screw-threaded sleeve completely circumferentially engaging said expanded mouth only.

References Cited in the file of this patent

UNITED STATES PATENTS

| | | |
|---|---|---|
| 1,184,484 | Muller | May 23, 1916 |
| 1,840,312 | Dunmire | Jan. 12, 1932 |
| 2,025,382 | Fletcher | Dec. 24, 1935 |
| 2,271,762 | Draper | Feb. 3, 1942 |
| 2,287,889 | Krumsiek et al. | June 30, 1942 |
| 2,319,024 | Wehringer | May 11, 1943 |
| 2,454,767 | Brushaber | Nov. 30, 1948 |
| 2,485,960 | Donahue | Oct. 25, 1949 |

FOREIGN PATENTS

| | | |
|---|---|---|
| 562,245 | Germany | Oct. 22, 1932 |
| 529,817 | Great Britain | Nov. 29, 1940 |
| 1,007,448 | France | Feb. 6, 1952 |
| 694,268 | Great Britain | July 15, 1953 |